United States Patent
Cheng et al.

(10) Patent No.: US 11,736,799 B2
(45) Date of Patent: Aug. 22, 2023

(54) ZOOM CONTROL METHOD, APPARATUS AND MEDIUM

(71) Applicant: Beijing Xiaomi Mobile Software Co., Ltd., Beijing (CN)

(72) Inventors: Chihyi Cheng, Beijing (CN); Liangming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/564,681

(22) Filed: Dec. 29, 2021

(65) Prior Publication Data
US 2023/0007181 A1 Jan. 5, 2023

(30) Foreign Application Priority Data
Jul. 1, 2021 (CN) .......................... 202110744581.X

(51) Int. Cl.
H04N 23/69 (2023.01)
H04N 23/63 (2023.01)
G02B 13/00 (2006.01)
G02B 15/04 (2006.01)
G06F 3/0488 (2022.01)

(52) U.S. Cl.
CPC .......... *H04N 23/69* (2023.01); *G02B 13/009* (2013.01); *G02B 13/0065* (2013.01); *G02B 15/04* (2013.01); *G06F 3/0488* (2013.01); *H04N 23/631* (2023.01); *G06F 2203/04806* (2013.01); *G06F 2203/04808* (2013.01)

(58) Field of Classification Search
CPC ...... H04N 23/69; H04N 23/631; H04N 23/62; H04N 23/632; H04N 23/695; H04N 23/58; G02B 13/0065; G02B 13/009; G02B 15/04; G06F 3/0488; G06F 2203/04806; G06F 2203/04808
See application file for complete search history.

(56) References Cited

U.S. PATENT DOCUMENTS

| | | | | |
|---|---|---|---|---|
| 2015/0304569 A1* | 10/2015 | Choi | ...................... | H04N 23/55 |
| | | | | 359/822 |
| 2017/0199621 A1* | 7/2017 | Ishitsuka | ................ | H04N 23/62 |
| 2019/0174054 A1* | 6/2019 | Srivastava | ............ | H04N 23/69 |

FOREIGN PATENT DOCUMENTS

| CN | 108170350 A | 6/2018 |
|---|---|---|
| CN | 112911093 A | 6/2021 |

OTHER PUBLICATIONS

European Search Report dated Jun. 24, 2022 for European Patent Application No. 21218177.0.

* cited by examiner

*Primary Examiner* — Mekonnen D Dagnew
(74) *Attorney, Agent, or Firm* — Volpe Koenig

(57) ABSTRACT

A zoom control method is provided, including: determining a midpoint of a connecting line of touch points located on both sides of an object to be close-up; determining a pixel vector formed from the midpoint of the connecting line to a center point of a screen; converting the pixel vector into an angle vector based on a conversion relationship between a diagonal angle of view of a current focal length range and a diagonal pixel of an image sensor of a camera system; and controlling the object to be close-up being moved to the center point of the screen based on the angle vector.

12 Claims, 5 Drawing Sheets

ZOOM CONTROL METHOD, APPARATUS AND MEDIUM

CROSS REFERENCE TO RELATED APPLICATIONS

The disclosure is based upon and claims priority to Chinese Patent Application No. 202110744581.X, filed on Jul. 1, 2021, the entire contents of which are incorporated herein by reference.

BACKGROUND

In related art, multiple camera modules with different focal lengths are generally adopted to synthesize the optical zoom of a mobile phone camera. This results in discontinuities in pictures during switching of the focal lengths, which affects the user experience and the video effect. Moreover, since the angle-of-view of the multiple camera modules are fixed, it can only switch towards the centers of the angles of view of the cameras with different focal length ranges, and it is impossible to perform smooth zoom switching at any point in a picture.

SUMMARY

The disclosure provides a zoom control method, an apparatus and a medium.

According to a first aspect of examples of the disclosure, a zoom control method is provided, including: determining a midpoint of a connecting line of touch points located on both sides of an object to be close-up; determining a pixel vector formed from the midpoint of the connecting line to a center point of a screen; converting the pixel vector into an angle vector based on a conversion relationship between a diagonal angle of view of a current focal length range and a diagonal pixel of an image sensor of a camera system; and controlling the object to be close-up being moved to the center point of the screen based on the angle vector.

According to a second aspect of examples of the disclosure, a zoom control apparatus is provided, including: one or more processors; and one or more memories configured to store instructions executable for the processor. The processor is configured to: determine a midpoint of a connecting line of touch points located on both sides of an object to be close-up; determine a pixel vector formed from the midpoint of the connecting line to a center point of a screen; convert the pixel vector into an angle vector based on a conversion relationship between a diagonal angle of view of a current focal length range and a diagonal pixel of an image sensor of a camera system; and control the object to be close-up being moved to the center point of the screen based on the angle vector.

According to a third aspect of examples of the disclosure, a non-transitory computer-readable storage medium is provided, storing computer program instructions thereon. The steps of the zoom control method provided in the first aspect of the disclosure are implemented when the program instructions are executed by a processor.

Understandably, the above general description and the following detailed description are examples and explanatory only, and are not intended to limit the disclosure.

BRIEF DESCRIPTION OF THE DRAWINGS

The accompanying drawings, which are incorporated in and constitute part of this specification, illustrate examples consistent with the disclosure and, together with the specification, serve to explain the principles of the disclosure.

DETAILED DESCRIPTION

Examples will be described in detail herein, examples of which are illustrated in the accompanying drawings. When the following description refers to the accompanying drawings, unless otherwise indicated, the same numbers in different drawings represent the same or similar elements. The implementation described in the following examples do not represent all implementations consistent with the disclosure. Rather, they are merely examples of apparatuses and methods consistent with some aspects of the disclosure as detailed in the appended claims.

Figure 1:
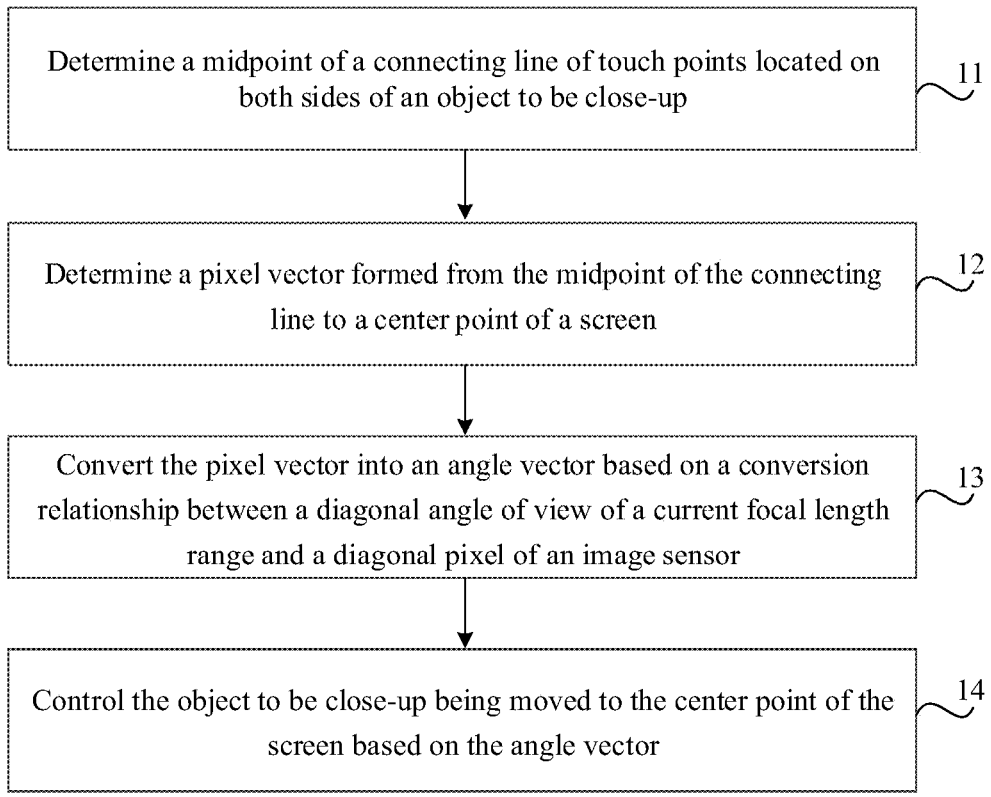
FIG. 1 is a flowchart of a zoom control method according to an example.

FIG. 1 is a flowchart of a zoom control method according to an example. As shown in FIG. 1, the zoom control method is applied to a mobile terminal, and includes the following steps.

In step S11, a midpoint of a connecting line of touch points located on both sides of an object to be close-up is determined.

The object to be close-up may be any object that needs to be close-up, such as portraits, flowers and plants, animals, and scenery.

When taking a photo with the mobile terminal, if a user intends to take a close-up shot on a certain object in the screen, the user may touch both sides of the object to be close-up simultaneously with two fingers, and a center position of the connecting line of the two touch points is determined as a position for close-up.

In step S12, a pixel vector formed from the midpoint of the connecting line to a center point of a screen is determined.

That is, a vector index is formed from the midpoint of the connecting line of the touch points to the center point of the screen, and the unit of the vector index is a pixel.

In step S13, based on a conversion relationship between a diagonal angle of view of a current focal length range and a diagonal pixel of an image sensor of a camera system, the pixel vector is converted into an angle vector.

In some examples, the conversion relationship between the diagonal angle of view of the current focal length range and the diagonal pixel of the image sensor of the camera system may be:

the diagonal angle/the diagonal pixel=2*tan^−1 (the size of the half-image height of the image sensor/current focal length range)/the number of diagonal pixels.

The size of the half-image height of the image sensor refers to a half of a diagonal size of the image sensor. For example, for a 35-mm equivalent camera, the size of the half-image height of the image sensor is 21.65 mm.

By means of the conversion relationship, the pixel vector in the unit of pixel can be converted into the angle vector in the unit of degree.

In step S14, the object to be close-up is controlled to move to the center point of the screen based on the angle vector.

By adopting the above technical solution, the pixel vector from the midpoint of the connecting line of the touch points to the center point of the screen can be converted into the angle vector, and the angle vector is used to control the object to be close-up to move to the center point of the screen, as a result, the switch between the scene and the close-up in the picture can be more flexible without manually moving the object to be close-up to the center of the screen picture and then conducting optical zooming, so that the discontinuity of pictures during focal length switching is avoided, and a function of optical zooming for any point in a full picture cannot be limited to a minimum focal length picture, but an optical zooming effect on any position in the full picture can be easily achieved.

Figure 2:
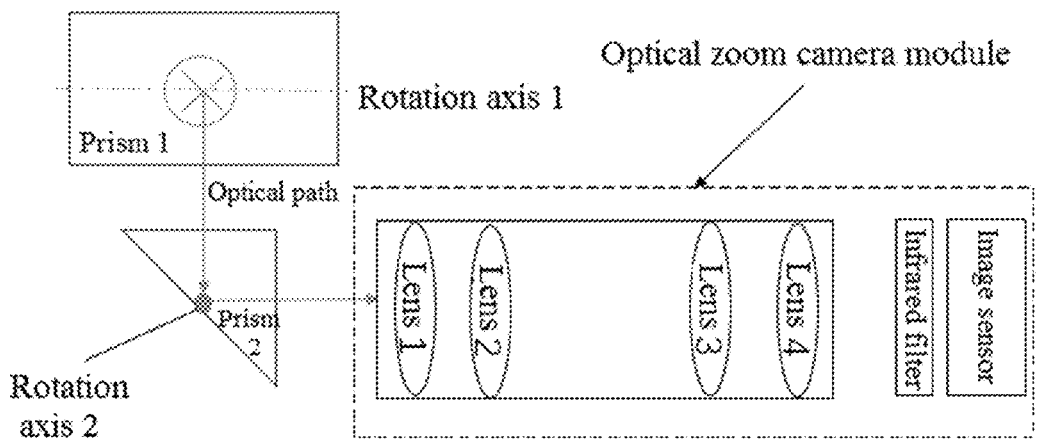
FIG. 2 is a schematic top view of an example of a camera system applicable to the zoom control method according to examples of the disclosure.
Figure 3:
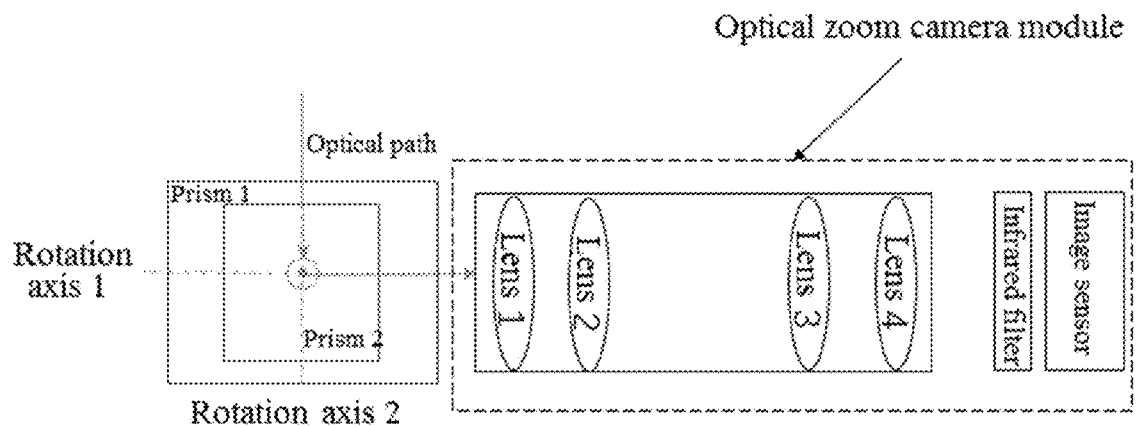
FIG. 3 is a schematic front view of an example of a camera system applicable to the zoom control method according to examples of the disclosure.

The zoom control method according to the examples of the disclosure can be applied to any camera system. FIG. 2 is a schematic top view of an example of the camera system applicable to the zoom control method according to examples of the disclosure. FIG. 3 is a schematic front view of an example of the camera system applicable to the zoom control method according to examples of the disclosure.

As shown in FIG. 2 and FIG. 3, the camera system includes two groups of uniaxial rotatable prisms and an optical zoom camera module. Twice the total uniaxial rotation angle of the prisms shall be greater than an angle difference between a diagonal angle of view of a picture with a minimum optical zoom ratio and a diagonal angle of view of a picture with a maximum optical zoom ratio. For example, the prism, a reflective surface of which may rotate +/−10 degrees, is matched with the optical zoom camera module, the diagonal angle of view of the picture with the minimum ratio of which is 80 degrees and the diagonal angle of view of the picture with the maximum ratio of which is 40 degrees, so as to form the camera system.

In some examples, under the condition of using a prism by a light deflection component of the camera system, the step S14 that the object to be close-up is controlled to move to the center point of the screen based on the angle vector may include the following steps: based on a corresponding relationship between a moving angle of the screen picture and a rotation angle of the prism, the angle vector is converted into the rotation angle of the prism, and the angle vector indicates the moving angle of the screen picture; and the rotation of the prism is controlled based on the rotation angle, so as to control the object to be close-up being moved to the center point of the screen.

The angle vector indicates the moving angle of the screen picture; this means that the degree of the screen picture will move depending on the degree of the angle vector.

Since the rotation of the prism will drive the screen picture to rotate, there is a corresponding relationship between the rotation angle of the prism and the rotation angle of the screen picture. For example, if the reflective surface of the prism rotates, the screen picture of the mobile terminal will change two degrees as the reflective surface of the prism rotates one degree. In this case, in order to move the object to be close-up to the center point of the screen, the rotation angle of the prism needs to be a half of the angle vector. In this way, the object to be close-up in the picture is moved to the center of the screen picture.

Figure 4:
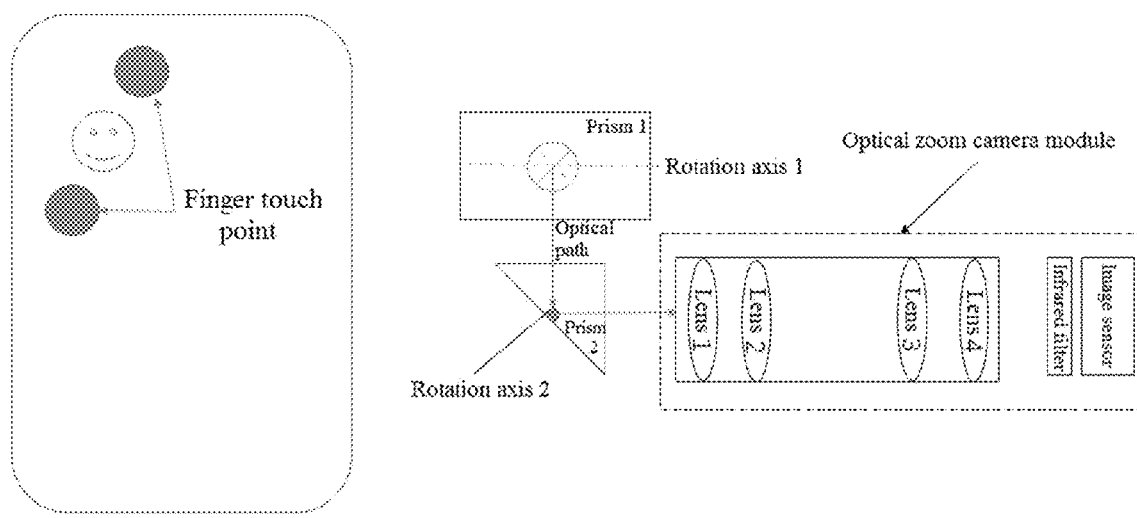
FIG. 4 and FIG. 5 are schematic diagrams of movement of a zoom center by taking the camera system shown in FIG. 2 as an example.
Figure 5:
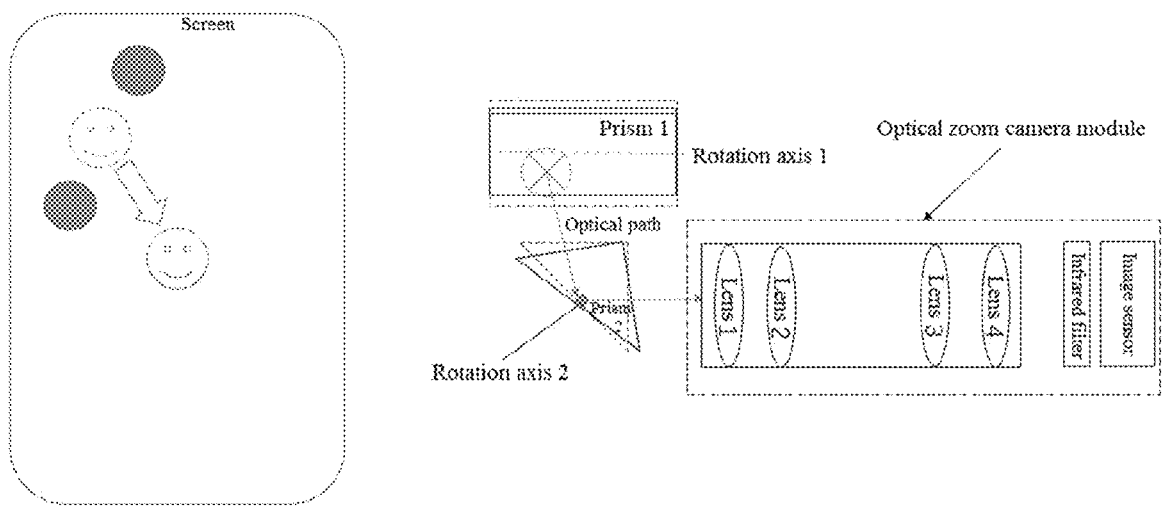

FIG. 4 and FIG. 5 are schematic diagrams of movement of a zoom center by taking the camera system shown in FIG. 2 as an example. First, in FIG. 4, both sides of the object to be close-up are touched with two fingers, so that the object to be close-up is locked. Then in FIG. 5, the rotation angle of the prism is set based on the determined angle vector, and then the prism is enabled to rotate, so that the object to be close-up can be driven to move to the center of the screen picture. In FIG. 5, the dashed face represents the position of the face before it is moved, and the solid-line face represents the position of the face after it is moved. It can be seen that the object to be close-up is moved to the center of the screen picture by means of the zoom control method according to the examples of the disclosure.

In some examples, the zoom control method according to the examples of the disclosure further includes: determining a distance ratio between a distance after at least one of the touch points is dragged and a distance before the at least one of the touch points is dragged; and controlling zoom scale based on the distance ratio.

Figure 6:
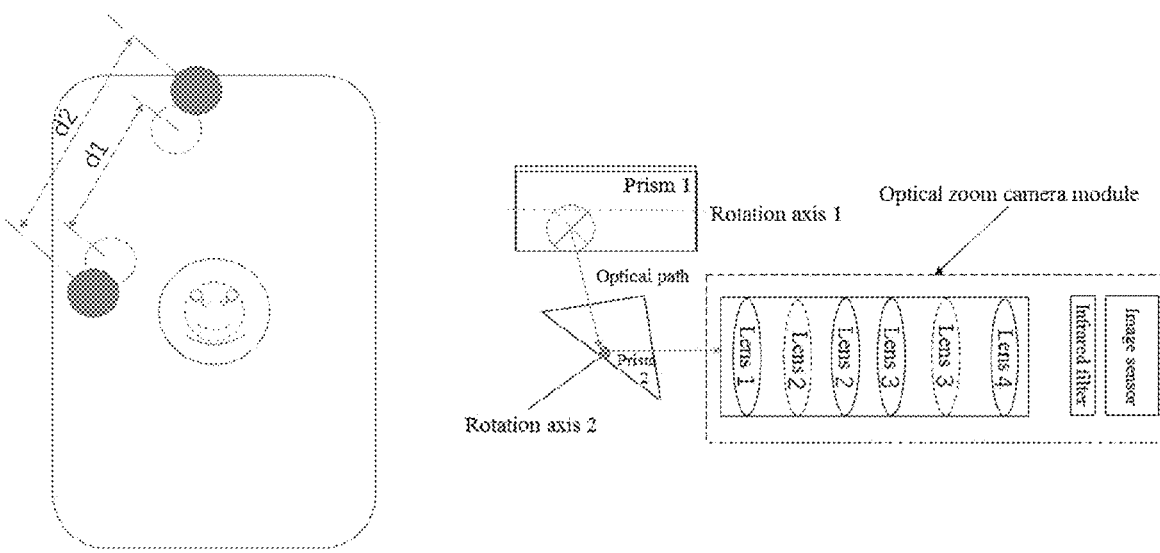
FIG. 6 is a schematic diagram of zoom ratio control by taking the camera system shown in FIG. 2 as an example.

For example, a user selects the object to be close-up by touching both sides of the object to be close-up. At this time, a distance between the two touch points is d1. Then, if the user wants to zoom up or zoom down, so the user drags at least one of the two touch points inwards or outwards, enabling the distance between the two touch points after dragging to be d2, and the distance ratio between the distance after at least one of the two touch points is dragged and the distance before the at least one of the two touch points is dragged is d2/d1. In such a way, the zoom scale can be easily controlled. As shown in FIG. 6, by means of simple dragging, in the process of moving the object to be close-up to the center of the screen picture, the object to be close-up is also zoomed up at the same time. In FIG. 6, the dashed face represents the face before the zooming, and the solid-line face represents the face after the zooming.

Figure 7:
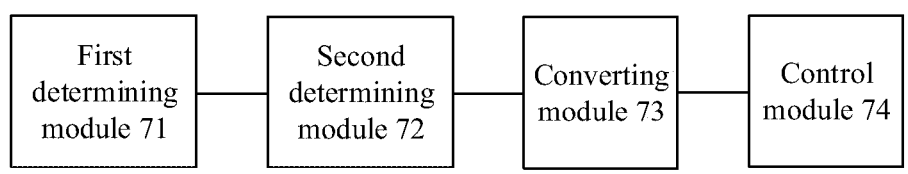
FIG. 7 is a block diagram of a zoom control apparatus according to an example.

FIG. 7 is a block diagram of a zoom control apparatus according to an example. Referring to FIG. 7, the apparatus includes: a first determining module 71, configured to determine a midpoint of a connecting line of touch points located on both sides of an object to be close-up; a second determining module 72, configured to determine a pixel vector formed from the midpoint of the connecting line to a center point of a screen; a converting module 73, configured to convert the pixel vector into an angle vector based on a conversion relationship between a diagonal angle of view of a current focal length range and a diagonal pixel of an image sensor of a camera system; and a control module 74, configured to control the object to be close-up being moved to the center point of the screen based on the angle vector.

By adopting the above technical solution, the pixel vector from the midpoint of the connecting line of the touch points to the center point of the screen can be converted into the angle vector, and the angle vector is used to control the object to be close-up being moved to the center point of the screen, as a result, the switch between the scene and the close-up in the picture can be more flexible without manually moving the object to be close-up to the center of the screen picture and then conducting optical zooming, so that the discontinuity of pictures during focal length switching is avoided, and a function of optical zooming for any point in a full picture cannot be limited to a minimum focal length picture, but an optical zooming effect on any position in the full picture can be easily achieved.

In some examples, the conversion relationship between the diagonal angle of view of the current focal length range and the diagonal pixel of the image sensor of the camera system may be: the diagonal angle/the diagonal pixel=2*tan^−1 (the size of the half-image height of the image sensor/current focal length range)/the number of diagonal pixels.

In some examples, under the condition of using a prism by a light deflection component of the camera system, the control module 74 is further configured to: convert the angle vector into a rotation angle of the prism based on a corresponding relationship between a moving angle of the screen picture and the rotation angle of the prism, and the angle vector indicates the moving angle of the screen picture; and control the rotation of the prism based on the rotation angle, to control the object to be close-up being moved to the center point of the screen.

Figure 8:
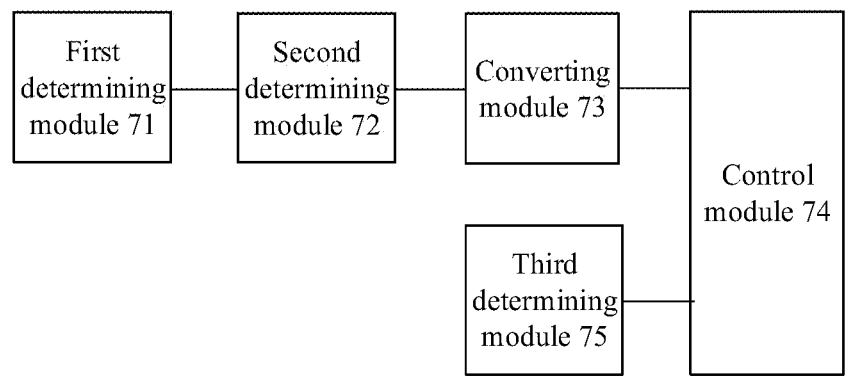
FIG. 8 is a schematic block diagram of a zoom control apparatus according to another example of the disclosure.

FIG. 8 is a schematic block diagram of the zoom control apparatus according to another example of the disclosure. As shown in FIG. 8, the zoom control apparatus further includes: a third determining module 75, configured to determine a distance ratio between a distance after at least one of the touch points is dragged and a distance before the at least one of the touch points is dragged; and the control module 74 is further configured to control zoom scale based on the distance ratio.

As for the apparatus in the above examples, specific implementations used by each module to execute operations have been described in detail in the examples of the method, and will not be elaborated here.

The disclosure further provides a computer-readable storage medium, storing a computer program instruction thereon. The program instruction, when executed by a processor, realizes the steps of the zoom control method provided by the disclosure.

Figure 9:
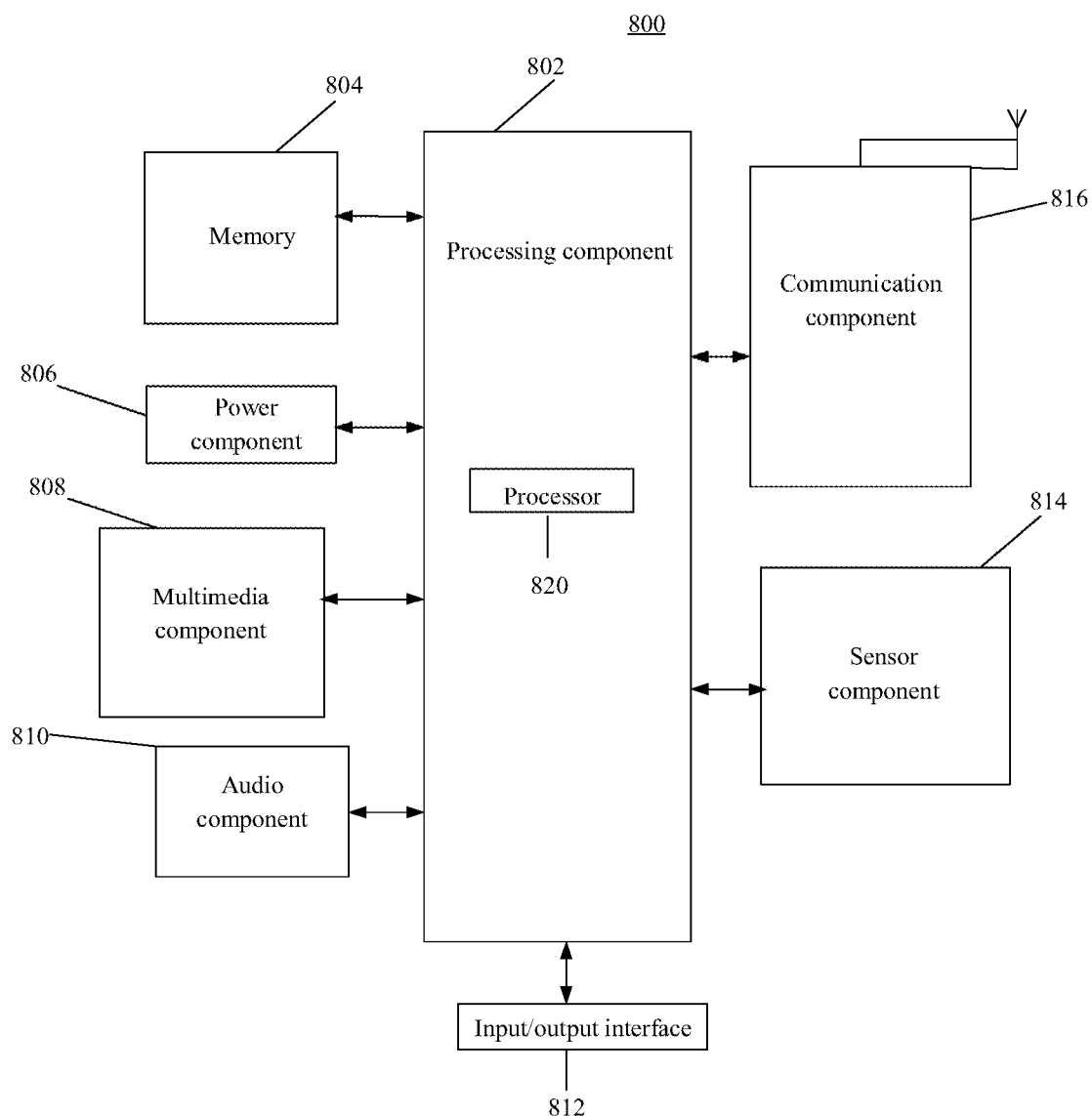
FIG. 9 is a block diagram of an apparatus for zoom control according to an example.
Figure 5:
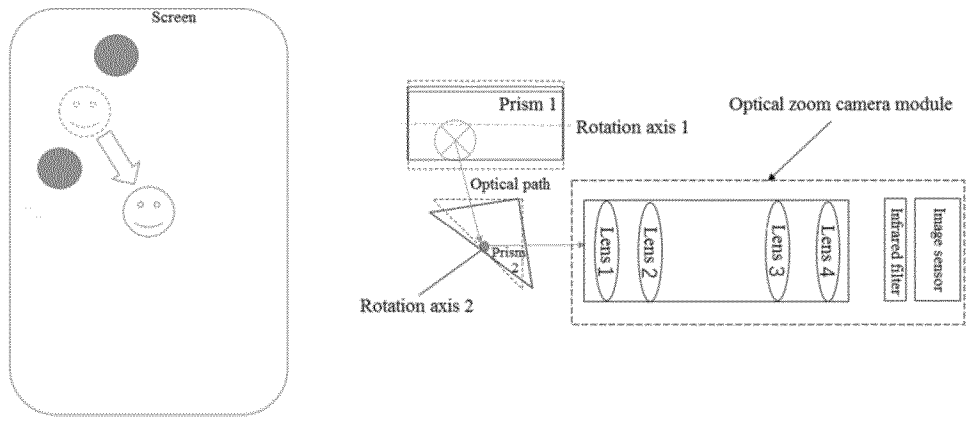
Figure 6:
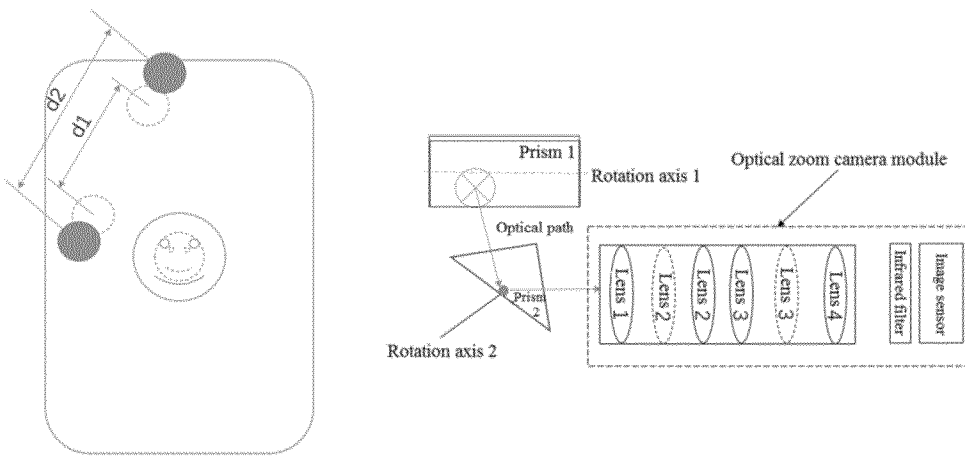

FIG. 9 is a block diagram of an apparatus 800 for zoom control according to an example. For example, the apparatus 800 may be a mobile phone, a computer, a digital broadcasting terminal, a message transceiver device, a game console, a tablet device, a medical device, a fitness device, a personal digital assistant, and the like.

Referring to FIG. 9, the apparatus 800 may include one or more of the following components: a processing component 802, a memory 804, a power component 806, a multimedia component 808, an audio component 810, an Input/Output (I/O) interface 812, a sensor component 814, and a communication component 816.

The processing component 802 generally controls overall operations of the apparatus 800, such as operations related to displaying, telephone calls, data communications, camera operations, and recording operations. The processing component 802 may include one or more processors 820 to execute instructions to complete all or part of the steps of the above zoom control method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support the operations at the apparatus 800. Examples of such data include instructions for any application program or method operated on the apparatus 800, contact data, phone book data, messages, pictures, videos, and the like. The memory 804 may be implemented by any type of volatile or non-volatile storage devices or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read-Only Memory (ROM), a magnetic memory, a flash memory, a magnetic disk or an optical disk.

The power component 806 provides power to various components of the apparatus 800. The power component 806 may include a power management system, one or more power supplies, and other components related to generation, management, and distribution of power for the apparatus 800.

The multimedia component 808 includes a screen that provides an output interface between the apparatus 800 and a user. In some examples, the screen may include a Liquid Crystal Display (LCD) and a Touch Panel (TP). If the screen includes the TP, the screen may be implemented as a touch screen to receive an input signal from a user. The TP includes one or more touch sensors to sense touch, swipe, and gestures on the TP. The touch sensor may not only sense a boundary of a touch or swipe action, but also detect duration and pressure related to the touch or swipe operation. In some examples, the multimedia component 808 includes a front camera and/or a rear camera. When the apparatus 800 is in an operation mode, such as a photographing mode or a video mode, the front camera and/or the rear camera may receive external multimedia data. Each of the front camera and the rear camera may be a fixed optical lens system or may have focal length and optical zoom capabilities.

The audio component 810 is configured to output and/or input audio signals. For example, the audio component 810 includes a microphone (MIC), and the microphone is configured to receive an external audio signal when the apparatus 800 is in an operation mode, such as a calling mode, a recording mode, and a voice recognition mode. The received audio signal may be further stored in the memory 804 or transmitted via the communication component 816. In some examples, the audio component 810 further includes a speaker configured to output audio signals.

The I/O interface 812 provides an interface between the processing component 802 and a peripheral interface module. The peripheral interface module may be a keyboard, a click wheel, a button, and the like. These buttons may include, but not limited to: a home button, a volume button, a start button, and a lock button.

The sensor component 814 includes one or more sensors configured to provide various aspects of state assessment for the apparatus 800. For example, the sensor component 814 may detect an on/off state of the apparatus 800 and relative positioning of components. For example, the components are a display and a keypad of the apparatus 800. The sensor component 814 may further detect a position change of the apparatus 800 or one component of the apparatus 800, the presence or absence of user contact with the apparatus 800, orientation or acceleration/deceleration of the apparatus 800, and temperature variations of the apparatus 800. The sensor component 814 may include a proximity sensor configured to detect the presence of vicinal objects without any physical contact. The sensor component 814 may further include a light sensor, such as a Complementary Metal Oxide Semiconductor (CMOS) or Charge Coupled Device (CCD) image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communications between the apparatus 800 and other devices. The apparatus 800 may access a wireless network based on a communication standard, such as WiFi, 4G or 5G, or a combination thereof. In one example, the communication component 816 receives a broadcast signal or broadcast related information from an external broadcast management system via a broadcast channel. In one example, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In an example, the apparatus 800 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic elements to perform the above zoom control method.

In an example, there is further provided a non-transitory computer-readable storage medium including an instruction, such as a memory 804 including an instruction. The instruction may be executed by the processor 820 of the apparatus 800 to perform the above zoom control method. For example, the non-transitory computer-readable storage medium may be an ROM, a Random Access Memory (RAM), a CD-ROM, a magnetic tape, a floppy disk, an optical data storage device, and the like.

In another example, a computer program product is further provided. The computer program product includes a computer program that can be executed by a programmable apparatus. The computer program has a code part that is configured to, when executed by the programmable apparatus, implement the above zoom control method.

After considering the specification and implementing the disclosure, those skilled in the art will easily conceive other implementation solutions of the disclosure. The present application is intended to cover any variations, uses, or adaptive changes of the disclosure. These variations, uses, or adaptive changes follow the general principles of the disclosure and include common general knowledge or conventional technical means in the technical field, which are not disclosed herein. The specification and the examples are considered as being exemplary only, with a true scope and spirit of the disclosure being indicated by the following claims.

It should be understood that the disclosure is not limited to the precise structure that has been described above and shown in the drawings, and various modifications and changes can be made without departing from the scope thereof. The scope of the disclosure is only limited by the appended claims.

What is claimed is:

1. A zoom control method, comprising
   determining a midpoint of a connecting line of touch points located on both sides of an image of an object to be zoomed-in on, wherein the image of the object is displayed on a screen of a camera;
   determining a pixel vector formed from the midpoint of the connecting line to a center point of the screen;
   converting the pixel vector into an angle vector based on a conversion relationship between a diagonal angle of view of a current focal length range and a diagonal pixel of an image sensor of a camera system; and
   controlling the image of the object to move to the center point of the screen based on the angle vector.

2. The zoom control method according to claim 1, wherein the conversion relationship between the diagonal angle of view of the current focal length range and the diagonal pixel of the image sensor of the camera system is:
   the diagonal angle/the diagonal pixel=2*tan^−1 (the size of the half-image height of the image sensor/current focal length range)/the number of diagonal pixels.

3. The zoom control method according to claim 1, wherein the controlling the image of the object to move to the center point of the screen based on the angle vector, comprises:
   converting the angle vector into a rotation angle of a prism of the camera based on a corresponding relationship between a moving angle of a screen picture and the rotation angle of the prism, wherein the angle vector indicates the moving angle of the screen picture; and
   controlling the rotation angle of the prism based on the rotation angle, to move the image of the object to the center point of the screen.

4. The zoom control method according to claim 1, further comprising:
   determining a distance ratio between a distance after at least one of the touch points is dragged and a distance before the at least one of the touch points is dragged; and
   controlling zoom scale based on the distance ratio.

5. A zoom control apparatus, comprising
   one or more memories; and
   one or more processors that are communicatively coupled to the one or more memories;
   wherein the one or more processors are configured to:
   determine a midpoint of a connecting line of touch points located on both sides of an image of an object to be zoomed-in on, wherein the image of the object is displayed on a screen of a camera;
   determine a pixel vector formed from the midpoint of the connecting line to a center point of the screen;
   convert the pixel vector into an angle vector based on a conversion relationship between a diagonal angle of view of a current focal length range and a diagonal pixel of an image sensor of a camera system; and
   control the image of the object to move to the center point of the screen based on the angle vector.

6. The zoom control apparatus according to claim 5, wherein the conversion relationship between the diagonal angle of view of the current focal length range and the diagonal pixel of the image sensor of the camera system is:
   the diagonal angle/the diagonal pixel=2*tan^−1 (the size of the half-image height of the image sensor/current focal length range)/the number of diagonal pixels.

7. The zoom control apparatus according to claim 5, wherein the one or more processors are further configured to:
   convert the angle vector into a rotation angle of a prism of the camera based on a corresponding relationship between a moving angle of a screen picture and the rotation angle of the prism, wherein the angle vector indicates the moving angle of the screen picture; and
   control the rotation angle of the prism based on the rotation angle, to move the image of the object to the center point of the screen.

8. The zoom control apparatus according to claim 5, wherein the one or more processors are further configured to:
  determine a distance ratio between a distance after at least one of the touch points is dragged and a distance before the at least one of the touch points is dragged; and
  control zoom scale based on the distance ratio.

9. A non-transitory computer-readable storage medium, storing computer program instructions thereon for implementing a zoom control method, the computer program instructions when executed by a processor cause the processor to execute a method comprising:
  determining a midpoint of a connecting line of touch points located on both sides of image of an object to be zoomed-in on, wherein the image of the object is displayed on a screen of a camera;
  determining a pixel vector formed from the midpoint of the connecting line to a center point of the screen;
  converting the pixel vector into an angle vector based on a conversion relationship between a diagonal angle of view of a current focal length range and a diagonal pixel of an image sensor of a camera system; and
  controlling the image of the object to move to the center point of the screen based on the angle vector.

10. The non-transitory computer-readable storage medium according to claim 9, wherein the conversion relationship between the diagonal angle of view of the current focal length range and the diagonal pixel of the image sensor of the camera system is:
  the diagonal angle/the diagonal pixel=2*tan^-1 (the size of the half-image height of the image sensor/current focal length range)/the number of diagonal pixels.

11. The non-transitory computer-readable storage medium according to claim 9, wherein the,
  controlling the image of the object to move to the center point of the screen based on the angle vector comprises:
  converting the angle vector into a rotation angle of a prism of the camera based on a corresponding relationship between a moving angle of a screen picture and the rotation angle of the prism, wherein the angle vector indicates the moving angle of the screen picture; and
  controlling the rotation angle of the prism based on the rotation angle, to control the image of the object to move to the center point of the screen.

12. The non-transitory computer-readable storage medium according to claim 9, wherein the zoom control method comprises:
  determining a distance ratio between a distance after at least one of the touch points is dragged and a distance before the at least one of the touch points is dragged; and
  controlling zoom scale based on the distance ratio.

* * * * *

UNITED STATES PATENT AND TRADEMARK OFFICE
CERTIFICATE OF CORRECTION

PATENT NO. : 11,736,799 B2
APPLICATION NO. : 17/564681
DATED : August 22, 2023
INVENTOR(S) : Chihyi Cheng et al.

It is certified that error appears in the above-identified patent and that said Letters Patent is hereby corrected as shown below:

In the Drawings
Please replace Figs. 5-6 with Figs. 5-6 as shown on the attached page.

In the Specification
In Column 2, Line 46, delete "shot on" and insert -- shot of --, therefor.
In Column 6, Line 46, delete "but" and insert -- but are --, therefor.

In the Claims
In Column 7, Line 59, in Claim 1, delete "comprising" and insert -- comprising: --, therefor.
In Column 8, Line 33, in Claim 5, delete "comprising" and insert -- comprising: --, therefor.
In Column 10, Lines 9-10, in Claim 11, delete "controlling the image of the object to move to the center point of the screen based on the angle vector comprises:" and insert the same at Line 8, after "the," as a continuation point.

Signed and Sealed this
Twenty-third Day of January, 2024

Katherine Kelly Vidal
*Director of the United States Patent and Trademark Office*